United States Patent [19]

Livsey et al.

[11] Patent Number: 4,715,228

[45] Date of Patent: Dec. 29, 1987

[54] INSPECTION APPARATUS

[75] Inventors: Terry Livsey; Graham T. Foulkes, both of Colne, England

[73] Assignee: Rolls-Royce plc, London, England

[21] Appl. No.: 900,694

[22] Filed: Aug. 27, 1986

[30] Foreign Application Priority Data

Oct. 9, 1985 [GB] United Kingdom ............... 8524854

[51] Int. Cl.$^4$ .............................................. G01N 29/04
[52] U.S. Cl. .......................................... 73/640; 73/583
[58] Field of Search ........................ 73/583, 640, 637

[56] References Cited

U.S. PATENT DOCUMENTS 3,824,843 7/1974 Gebeshuber et al. ................ 73/640

FOREIGN PATENT DOCUMENTS 540204 2/1977 U.S.S.R. ................. 73/637

Primary Examiner—Stewart J. Levy
Assistant Examiner—Louis M. Arana
Attorney, Agent, or Firm—Cushman, Darby & Cushman

[57] ABSTRACT

It is common practice to pass an ultrasonic probe over a workpiece so as to enable examining of the material for faults such as flaws within the material thickness. Known apparatus for achieving this has a drawback in that the probe supporting structure is such that the probe oscillates about some point within its length, as the structure passes over curved or undulating surfaces. Control over the position of the focal point is thus lost. The invention involves ensuring that the pivot point of the probe coincides with its focal point which in turn enables control of the position of the focal point to be maintained.

6 Claims, 5 Drawing Figures

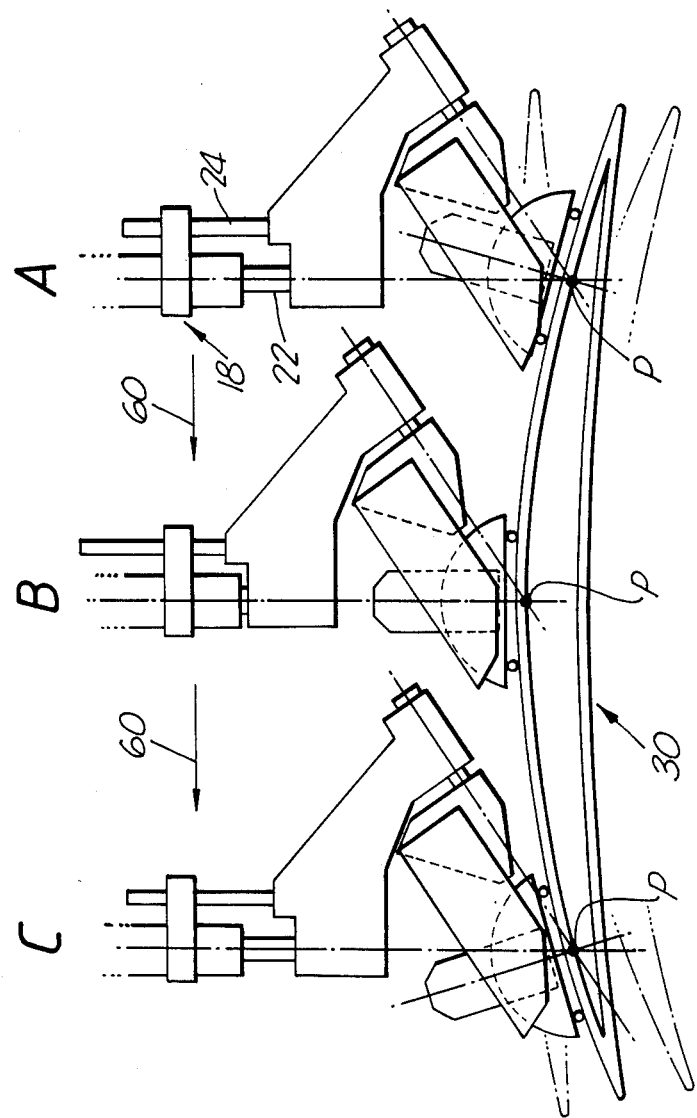

INSPECTION APPARATUS

The present invention relates to workpiece inspection apparatus of the kind which utilises a probe which is caused to traverse the workpiece.

Known apparatus has a drawback in that modulations or curvature in the workpiece surface being traversed, tends to displace the probe in an oscillatory manner and in such a way as to cause the probe to adopt an attitude in which it is not normal to the surface being traversed. Where the probe is an ultrasonic probe, pressure pulses are sent through the workpiece thickness as some undesired angle. Where the probe is a profile tracing probe, it does not directly reflect the true profile of the surface being traced and in both cases, a pre-selected grid pattern of inspection points relative to some datum, cannot be followed by the probe focal point or actual point.

The present invention seeks to provide improved inspection apparatus of the kind which utilises a probe.

Accordingly, the present invention comprises a device which in operation carries a probe and is moved over a workpiece surface so as to enable assessment of the workpiece by the probe and comprising a cradle and a cradle supporting head, wherein the cradle is adapted and arranged so as to enable adjustable positioning of a said probe thereon, and is further adapted in conjunction with the head so as to be arcuately movable relative thereto in at least one plane, about an axis which contains the sensing point of a said probe when a said probe is positioned thereon for operation.

The invention will now be described, by way of example and with reference to the accompanying drawings in which:

FIG. 5 is a view of the apparatus of FIG. 1 in operation.

Figure 1:
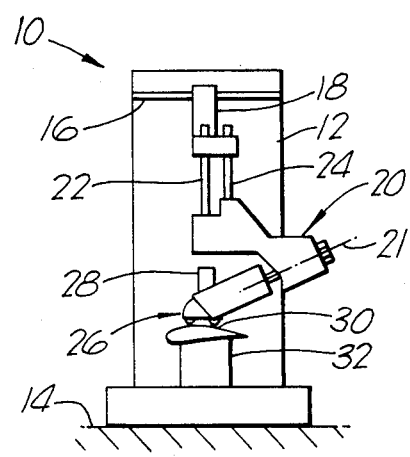
FIG. 1 is a diagrammatic view of apparatus which includes a cradle in accordance with the present invention.

Referring to FIG. 1. An ultrasonic testing device 10 includes a fixed structure 12 in the form of a pillar which rests on a table top 14. The pillar 12 has an inverted cross slide 16 which is engaged by a saddle 18 such that the saddle 18 can be slid left and right as viewed in the drawing.

A support head 20 is suspended from the saddle 18. The suspension is via spindles 22 and 24 both of which are retained in the saddle 18 by any convenient means such that they, and therefor the support head 20, may freely vertically reciprocate relative to the saddle 18, without dropping out.

The support head 20 carries a cradle 26 at an extremity and the cradle 26 in turn carries an ultrasonic probe 28. The cradle 26 is rotatable within the support head 20, about an axis 21 as will be described later in this specification.

The cradle 26 and its support head 20 are positioned over a workpiece 30 which is supported on a jig 32 which forms part of the device 10.

Figure 2:
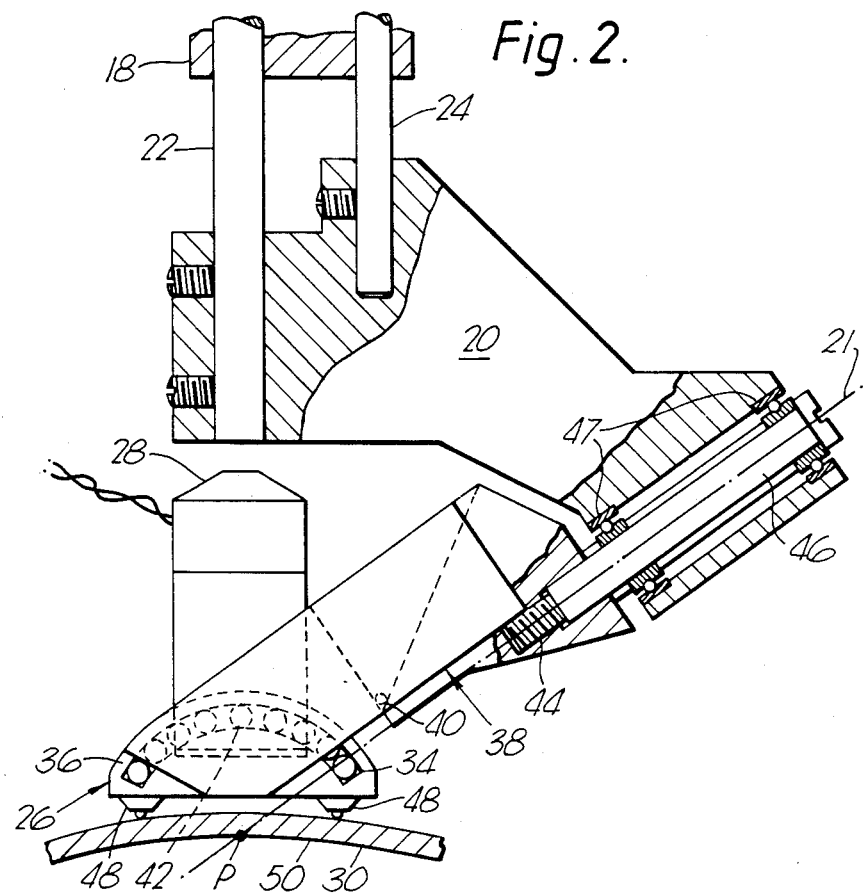
FIG. 2 is an enlarged part view of FIG. 1.
Figure 3:
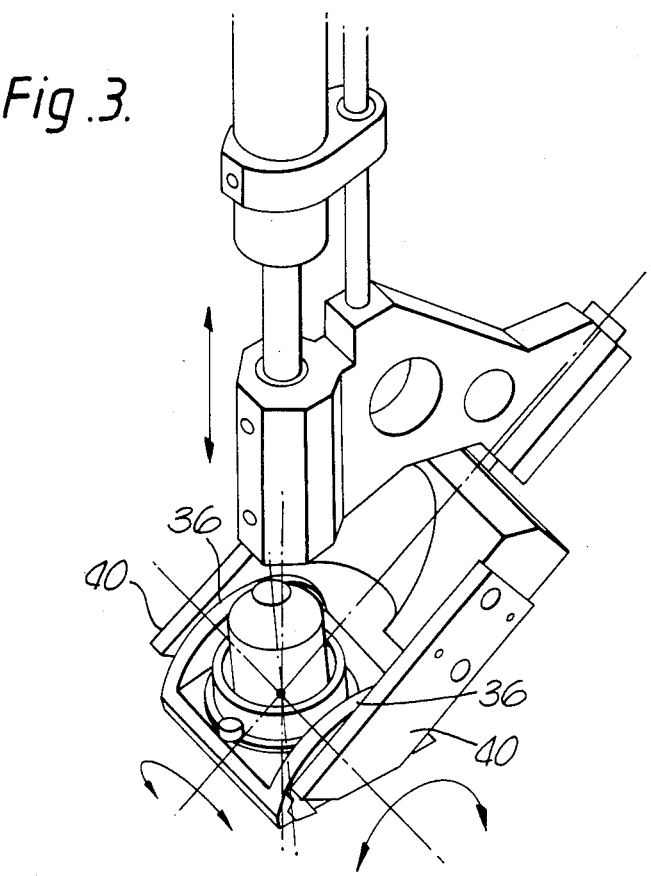
FIGS. 3 and 4 are pictorial part views of the apparatus of FIG. 1.
Figure 4:
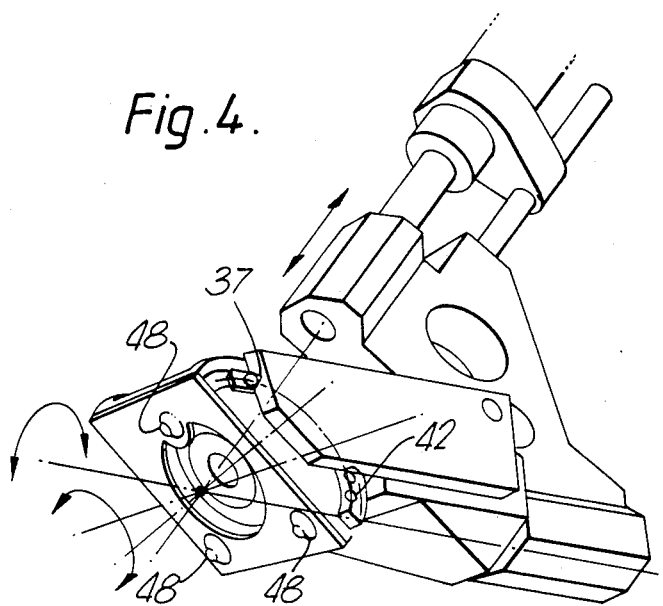

Referring now to FIG. 2. The probe 28 is a push fit in a hole in the floor of the cradle 26 and thus may be positioned at any place along the axis of the hole. The cradle 26 has a row of captive balls 42 in an arcuate slot 34 in the external surface of each side wall 36 and an extension 38 of the cradle 26 also has sidewalls 40 which straddle the sidewalls 36 of the cradle 26 as is seen in FIG. 3 and each include an arcuate 'v' groove 34, which engages with a respective arcuate row of captive balls 42, as also depicted in FIG. 4.

The extension 38 is connected to the cradle 26 via the thread 44 of a screwed shaft 46 which is held captive in the head. The shaft 46 is supported by bearings 47 in the head 20, and is thus rotatable about its axis 21. Cradle 26 therefor may be rotated about the same axis.

The cradle 26 is provided with a three point contact arrangement via which contact is made with the workpiece 30 and which consists of appropriately arranged local protuberances 48. This can be seen in FIG. 4.

In the present example, the probe 28 is an ultrasonic probe and the first aim is to position it so that in operation, its focal point coincides with the undersurface 50 of the workpiece 30. A second aim is to ensure that in the event of the cradle 26 rocking during traversing of the workpiece, the probe 28 will pivot about its focal point and thus have the focal point remain on a predicted path, rather than oscillating away from that path. This is achieved by arranging that both the common axis of the radii about which the arcuate slots 34 are struck and the axis 21 pass through the focal point 'p' of the probe 28. It follows that there must be a specific positional relationship between the axis of the radii of arc of the slots 34, the probe 28, the surface to be focussed upon and the proportions of the bearings 48. This is achieved by appropriate design of the cradle for a given workpiece or batch of workpieces, to be scanned.

The cradle 26 of the present example is designed so as to enable the mounting of the ultrasonic probe 28 thereon, such that the focal point 'P' of the probe 28 will be coincident with the inner surface of the workpiece 30 (in the present example, a hollow aerofoil blade), for the purpose of ultrasonically testing the material of the workpiece 30, and reference is now made to FIG. 5 which clearly shows this.

In operation, the cradle 26 rests on the blade 30, and when the probe 28 is focussed on the desired place on the blade 30, the cradle 26 is caused to traverse the outer surface of the blade 30, by the application of an appropriate force on the head 20 which supports it, in the direction indicated by the arrows 60 in FIG. 5. The head 20 with the saddle 18 thus moves along the slide 16 (FIG. 1) in a straight line.

The outer surface of the blade 30 is convex, which in combination with the horizontal movement of the cradle 26 and head 20 from position 'A' through 'B' to 'C' generates a resultant vertical force on the cradle 26. The cradle 26 and the head 20 thus rise, and fall, causing the spindles 22, 24 to slide through the saddle 18. Simultaneously, the cradle 26 moves bodily relative to the support head 20, on a path which is dictated by the interaction between the balls 42 and the arcuate grooves 34 i.e. on an arcuate path, the radius of which is the same as the arcuate grooves 34 and which centres on the axis of radii thereof. The probe 28, being fixed to the cradle 26, moves on the same arcuate path. The focal point 'P' of the probe 28 however, by virtue of it coinciding with the axis about which the arcuate slots 34 are struck, merely follows the line of the inner surface of the blade 30, without any deviation from its position relative to the head 20. The head 20 may thus be moved from one point to another point over the blade outer surface and the focal point 'P' will effectively move in an identical manner. Similarly, if undulations in the surface being traversed by the cradle 26 exert a side load thereon, the ability of the cradle 26 to swing about the axis 21 which passes through the focal point 'P' will ensure that the focal point 'P' remains on the under surface as described hereinbefore.

The invention has been described hereinbefore in connection with the use of an ultrasonic probe. However, the invention has efficacy when it is desired to trace a surface with a contact probe (not shown). the rise and fall of the head as the contact probe follows the curvature of the workpiece surface can be suitable reproduced in a readable signal or by use of any appropriate transducer (not shown). Moreover the arcuate movement of the cradle 26 about the contact point of the probe (not shown) would ensure a probe attitude which is normal to the surface being traced. A true magnitude of displacement of the probe (not shown) would thus be recorded.

We claim:

1. A device which in operation carries a probe and is moved over a workpiece surface so as to enable assessment of the workpiece by the probe and comprising a cradle and a cradle supporting head, wherein the cradle is adapted and arranged so as to enable adjustable positioning of said probe thereon and said cradle including a surface adapted in use to face said workpiece surface and including means for spacing said surface of said cradle a predetermined distance from said workpiece surface, and means for mounting said cradle for rotational movement about a first axis which passes through the sensing point of the probe and means for mounting said cradle for movement about a second axis which intersects said first axis at a right angle and which passes through said sensing point of said probe when a said probe is positioned on said cradle for operation.

2. A device as claimed in claim 1 wherein the cradle has a first pair of sidewalls each of which has track engaging means on an exterior surface and the cradle supporting head has a further pair of sidewalls which straddle the first pair of sidewalls and contain an arcuate track on each inner surface, which arcuate track cooperates with the track engaging means so as to enable said arcuate movement of the cradle.

3. A device as claimed in claim 2 wherein the track engaging means comprises arcuate rows of captive, rotatable balls and the tracks comprise cooperating grooves.

4. A device as claimed in claim 2 wherein the further sidewalls are connected to supporting head via a shaft which with the cradle, is rotatable relative to the remainder of the supporting head in a plane which is parallel to said second axis.

5. A device as claimed in claim 1 wherein the probe comprises an ultrasonic probe and its focal point is the sensing point.

6. A device as claimed in claim 1 wherein the probe is a contact probe and its point of contact with a workpiece is the sensing point.

* * * * *